(12) United States Patent
Smit

(10) Patent No.: US 7,013,796 B2
(45) Date of Patent: Mar. 21, 2006

(54) COFFEE DOSING APPARATUS

(75) Inventor: Gerard Clement Smit, Amerongen (NL)

(73) Assignee: Smitdesign B.V., Amerongen (NL)

( * ) Notice: Subject to any disclaimer, the term of this patent is extended or adjusted under 35 U.S.C. 154(b) by 146 days.

(21) Appl. No.: 10/649,460

(22) Filed: Aug. 27, 2003

(65) Prior Publication Data

US 2005/0028677 A1    Feb. 10, 2005

(30) Foreign Application Priority Data

Aug. 27, 2002    (NL)    .................................... 1021341

(51) Int. Cl.
*A23L 1/00*    (2006.01)
*A47J 31/34*    (2006.01)

(52) U.S. Cl. .................... 99/286; 99/289 R; 99/510

(58) Field of Classification Search .......... 99/352–355, 99/494, 279, 286, 287, 289 R, 290, 295–300, 99/510; 222/196, 200, 202, 203, 226, 232–235
See application file for complete search history.

(56) References Cited

U.S. PATENT DOCUMENTS

| | | | | |
|---|---|---|---|---|
| 3,791,284 A | * | 2/1974 | Donot ....................... | 99/289 R |
| 4,103,602 A | * | 8/1978 | Oggioni et al. ........... | 99/494 X |
| 4,797,296 A | * | 1/1989 | Meier et al. ............... | 426/433 |
| 4,852,472 A | * | 8/1989 | In-Albon et al. ......... | 99/289 R |
| 5,154,111 A | * | 10/1992 | Luciano ..................... | 99/289 R |
| 5,302,407 A | * | 4/1994 | Vetterli ....................... | 426/433 |
| 5,649,412 A | * | 7/1997 | Binacchi ...................... | 53/559 |
| 5,650,186 A | * | 7/1997 | Annoni et al. .............. | 426/231 |
| 5,699,724 A | * | 12/1997 | Wettstein et al. ............. | 99/489 |
| 6,067,894 A | * | 5/2000 | Eugster ...................... | 99/494 X |
| 6,095,032 A | * | 8/2000 | Barnett et al. ............ | 99/494 X |
| 6,786,356 B1 | * | 9/2004 | Geiger et al. ................. | 221/96 |

FOREIGN PATENT DOCUMENTS

| | | |
|---|---|---|
| DE | 198 32 413 | 1/2000 |
| FR | 1 341 016 | 9/1962 |
| FR | 2 646 656 | 11/1990 |
| FR | 2 678 912 | 1/1991 |
| GB | 626667 | 7/1949 |

* cited by examiner

*Primary Examiner*—Timothy F. Simone
(74) *Attorney, Agent, or Firm*—Merchant & Gould P.C.

(57) ABSTRACT

A coffee dosing apparatus provided with a holder for coffee powder and a dosing mechanism, the dosing mechanism being provided with a dosing chamber, which is bounded at a lower side by a bottom wall with a discharge opening, and which is bounded at an upper side by an upper wall with a feed opening, a rotatable dosing element bounding portion spaces being arranged in the dosing chamber, a driving element being connected with the dosing element, wherein between the driving element and the dosing element a coupling is provided, which is such that the dosing element is rotatable in limited steps, at the end of a limited step a mentioned portion space being located above the discharge opening, and a next limited step being startable only after the preceding limited step has been rounded off completely.

8 Claims, 6 Drawing Sheets

COFFEE DOSING APPARATUS

FIELD OF THE INVENTION

The invention relates to a coffee dosing apparatus provided with a holder for coffee powder and a dosing mechanism, the dosing mechanism being provided with a dosing chamber, which is bounded at a lower side by a bottom wall with a discharge opening, and which is bounded at an upper side by an upper wall with a feed opening, the feed opening being rotationally staggered relative to the discharge opening, such that the upper wall extends above the discharge opening, a dosing element bounding portion spaces and being rotatable about a substantially vertically extending axis being arranged in the dosing chamber, a driving element being connected with the dosing element.

BACKGROUND OF THE INVENTION

Such an apparatus is known from French patent publication FR-A-2 646 656. In this known apparatus, the dosing element is firmly connected with a rotation shaft, which, in a manner not explained in more detail, is connected with a drive. In the known apparatus, it is therefore possible very well that a portion space is not positioned completely above the discharge opening when a next coffee portion is desired. In that condition, it is possible very well that not the complete portion space is emptied and that when dosing a next coffee portion, the coffee remaining from the preceding dosing action is still discharged unintentionally. It may be clear that thus an undesired effect of the known apparatus is obtained, because an undesired amount of coffee is delivered.

Also FR-A-1 341 016 shows such an apparatus. In this known apparatus, the dosing element is driven by a motor, which, via a transmission, an eccentric, a connecting rod with a cam, and a gear wheel connected with the dosing element, each time brings the dosing element into a next position. In the known apparatus, the stroke made by the gear wheel and hence the dosing element is dependent on the time during which the cam engages the gear wheel, which time again is dependent on the stroke of the eccentric. Because the stroke of the eccentric is determined by the distance from the rotation shaft of the eccentric to the eccentric point, because the eccentric is motor-driven, and because the motor each time makes only one or several complete strokes, the dosing element will always round off a dosing step completely. The known apparatus, however, cannot function properly in case of manual operation. In fact, man is not capable of each time accurately determining when a stroke has been made completely and, therefore, the dosing step has been rounded off completely.

BRIEF SUMMARY OF THE INVENTION

It is an object of the invention to provide a solution to this problem and, to this end, to provide an apparatus of the type described in the opening paragraph, which is characterized in that the driving element comprises a manually operable handle, between the handle and the dosing element a coupling being provided, which is such that the dosing element is rotatable in limited steps, at the end of a limited step a mentioned portion space being located above the discharge opening, and a next limiting step being startable only after the preceding limited step has been rounded off completely, the coupling comprising a double ratchet mechanism.

As a result of the presence of this coupling designed as double ratchet mechanism, it is ensured that the user is forced to always round off a limited rotation step before a next dosing action can be started. In general, a user will return the driving element again to the start position. To be able to do so, it is necessary that this user rounds off the complete dosing or rotation step. When a previous user has not rounded off the last rotation step, the new user will first have to round off the last rotation step before a next dosing action can be started. As a result of this operation, complete portions will always be taken in normal use.

According to a further elaboration of the invention, the double ratchet mechanism may be provided with a ratchet wheel, a first ratchet spring and a second ratchet spring, the ratchet wheel being connected with the dosing element so as to be restrained from rotation, the first ratchet spring being connected with the handle, the second ratchet spring being firmly connected with the lower side of the bottom wall, the ratchet wheel being located at the lower side of the bottom wall.

With such a coupling, the intended effect is relatively simply obtained. In fact the first ratchet spring, which is firmly connected with the driving element, pushes the ratchet wheel along until the second ratchet spring, which is firmly connected with the bottom wall, clicks behind a next tooth of the ratchet wheel. Only then can the driving element be moved back so far that the first ratchet spring again can click behind a next tooth of the ratchet wheel. If, when dosing, the driving element is not pressed into its extreme position, then the second ratchet spring will not click behind the next tooth of the ratchet wheel, and the first ratchet spring, during the return movement of the driving element, cannot click behind the next tooth, so that a next dosing action is not possible. For this next dosing action, it is necessary to completely round off the preceding dosing action by first bringing the driving element into the extreme position. The limited rotation steps of the dosing element are, moreover, separated from each other by stops and by clear click sounds caused by the ratchet springs clicking behind a next tooth of the ratchet wheel. The user, therefore, can notice very well when the rotation step has been rounded off. It is noted that, in this connection, "ratchet spring" is also understood to mean a form-retaining ratchet, which is pressed against the ratchet wheel under spring stress.

Optionally, according to a further elaboration of the invention, a coffee grinder can be mounted on an upper side of the holder.

When the holder of the dosing apparatus threatens to empty, the coffee grinder can be operated for filling the holder. It is thus ensured that each time freshly ground coffee is present in the holder of the coffee dosing apparatus. When the user chooses to buy ground coffee, a cover, instead of a coffee grinder, can simply be placed on the upper side of the holder.

It is noted that from GB 626 667 an apparatus is known for delivering powder in doses, a coupling being used between an operating handle and a dosing cylinder, which coupling is provided with a ratchet wheel and two leaf springs cooperating therewith. In a forward stroke of the operating handle, the one leaf spring engages the ratchet wheel and thus rotates the dosing cylinder. The other leaf spring prevents rotation of the cylinder when the one leaf spring connected with the operating handle is moved back. A drawback of this known apparatus is that the dosing cylinder rotates about a horizontal shaft. The rotation of that shaft cannot be used for other functions, as may be the case in the apparatus according to the invention. Thus, the rotation of the vertical shaft of the dosing element of the apparatus according to the invention may also be used for driving a loosening element to prevent bridge building of coffee powder in the reservoir. Furthermore, the vertical shaft may be used for driving a wiper for wiping clean the transparent side wall of the reservoir. In the British apparatus, such functionality is not, and cannot be, derived from the rotation of the dosing cylinder.

BRIEF DESCRIPTION OF THE DRAWINGS

Further elaborations are described in the subclaims and will be explained below in more detail on the basis of an exemplary embodiment.

DETAILED DESCRIPTION

Figure 1:
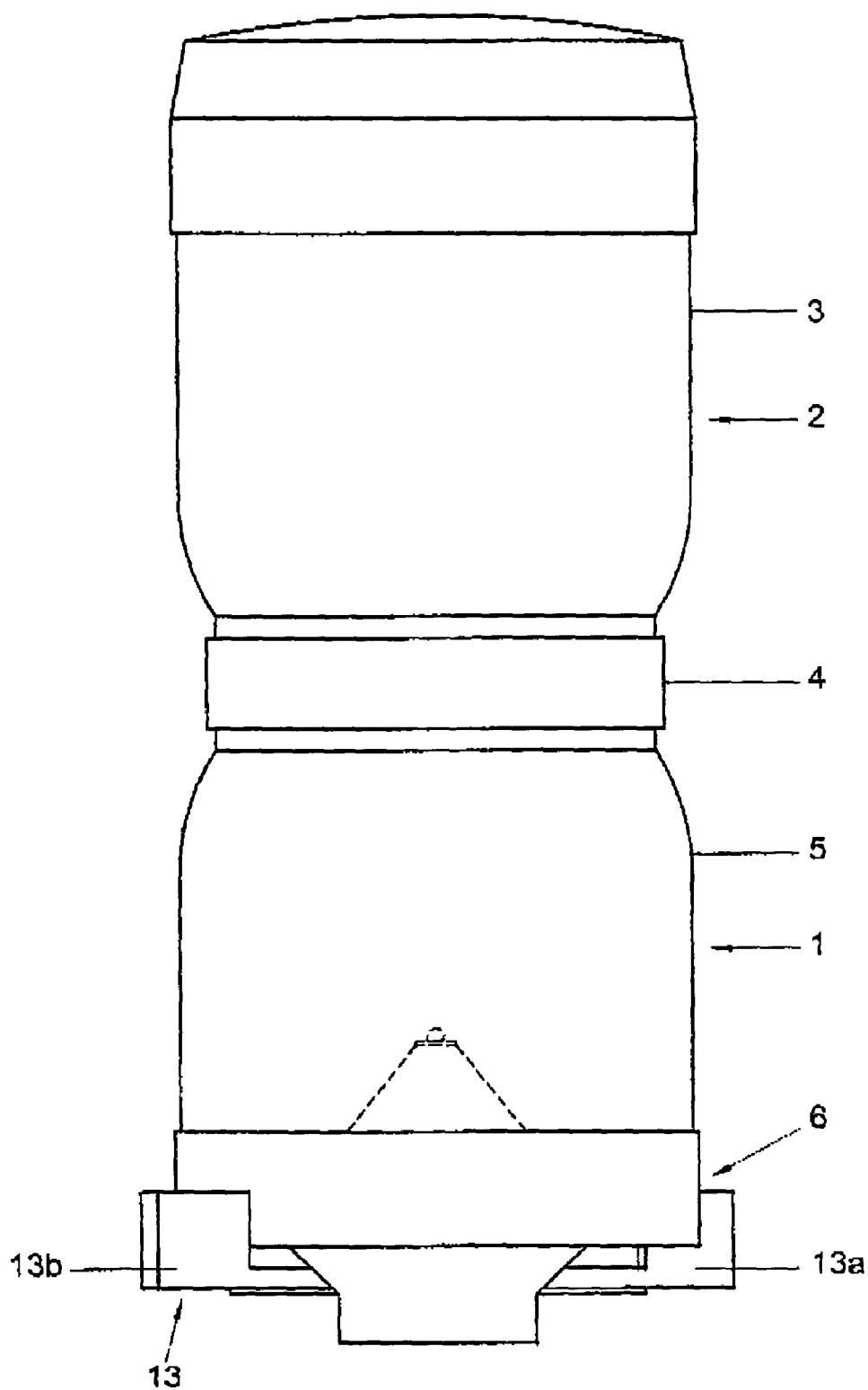
FIG. 1 shows a front view of a dosing apparatus with a coffee grinder mounted thereon.

FIG. 1 shows, in front view, a coffee dosing apparatus 1 with a coffee grinder 2 mounted thereon. The coffee grinder 2 is provided with a holder 3, which holder 3 is provided at a lower end with thread. The thread engages a ring 4, which, in turn, is screwed on a holder 5 of the coffee dosing apparatus 1. To this end, the holder 5 is provided near an upper end with thread. Furthermore, the holder 5 is transparent, so that the contents thereof can be inspected by the user. Located near a lower end of the holder is a dosing mechanism 6, which is represented in more detail in FIGS. 2 and 3.

Figure 2:
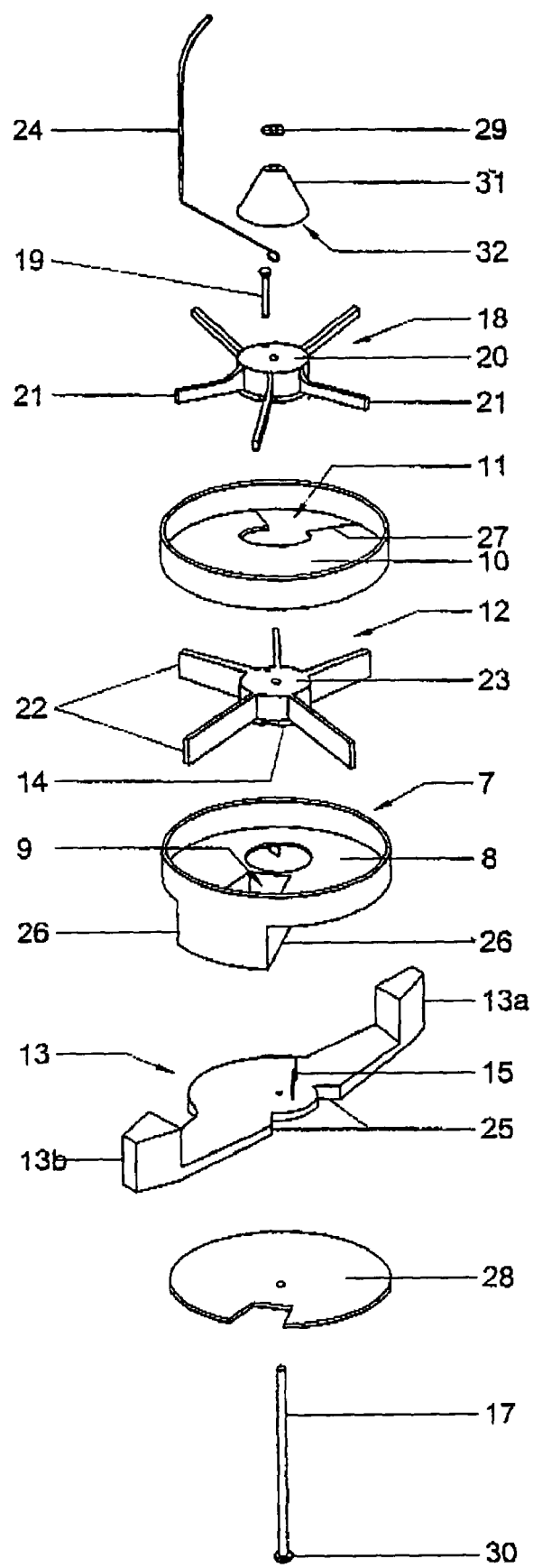
FIG. 2 shows a perspective top view of the dosing apparatus with parts taken apart, with the exception of the holder and the cover.
Figure 3:
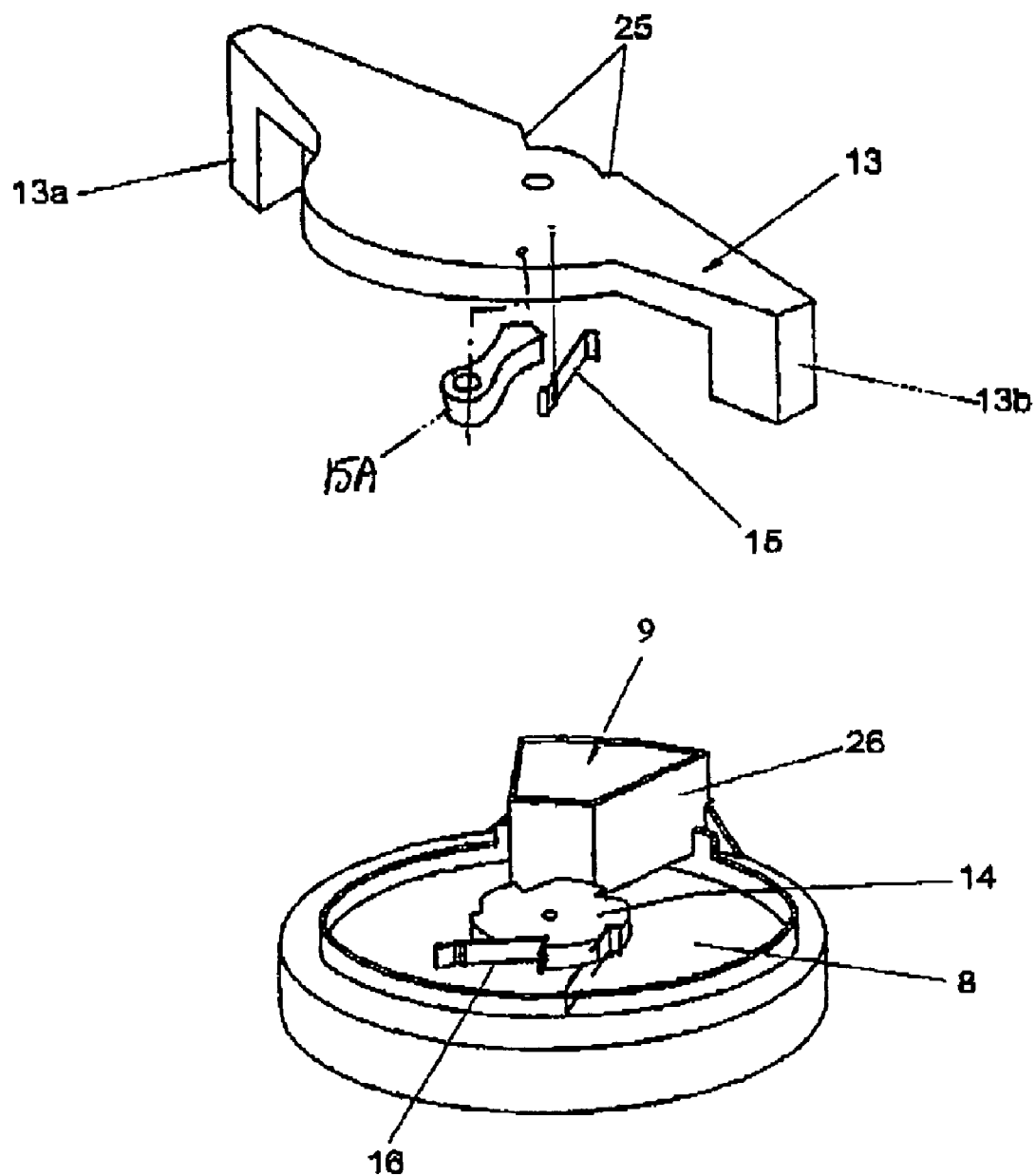
FIG. 3 shows a perspective bottom view of the driving element, the coupling and the bottom wall of the dosing chamber.

The dosing mechanism 6 is provided with a dosing chamber 7, which is bounded at a lower side by a bottom wall S. Provided in the bottom wall 8 is a discharge opening 9. At the upper side, the dosing chamber 7 is bounded by an upper wall 10 with a feed opening 11. Arranged in the dosing chamber 7 is a rotatable dosing element 12 bounding portion spaces. A driving element 13, in the present exemplary embodiment designed as a manually operable handle 13, is connected with the dosing element 12 via a coupling 14, 15, 16. The coupling is of such design that the dosing element 12 is rotatable in limited steps. Through the symmetric positioning of the operating handle 13 relative to the apparatus and through the two operating grips 13a, 13b thereon, this operating handle 13 is comfortably operable both by right-handers and by left-handers. Located at the end of a limited step is a mentioned portion space right above the discharge opening 9. As a result of the design of the coupling, a next limited step of the dosing element 12 can only be started after the preceding limited step has been rounded off completely. In the present exemplary embodiment, the coupling is designed as a double ratchet mechanism. A ratchet wheel 14, which is clearly visibly represented in FIG. 3, is connected with the dosing element 12 so as to be restrained from rotation. A first ratchet spring 15 is firmly connected with the driving element 13. A second ratchet spring 16 is connected with a lower side of the bottom wall 8. As clearly appears from FIG. 3, the ratchet wheel 14 is located at the lower side of the bottom wall 8. Furthermore, in FIG. 2, too, the ratchet wheel 14 is partly visible. FIG. 2 also shows the first ratchet spring 15 on the operating handle 13. One ratchet spring or both ratchet springs may also be designed as form-retaining ratchets 15A, which are pressed against the ratchet wheel 14 under spring action. Both the operating handle 13 and the dosing element 12 are rotatably attached to a central shaft 17. Also mounted on this shaft 17 is a loosening element 18. The loosening element 18 is connected with the dosing element 12 so as to be restrained from rotation. In the present exemplary embodiment, this connection is realized with the pin 19. The loosening element 18 comprises a central hub 20 with a number of arms 21 radially extending from this hub 20. These arms 21 loosen the coffee present in the holder 5 so as to prevent bridge building in the coffee above the feed opening 11, which bridge building may have the result that the portion spaces bounded by the dosing element 12 are not properly filled with coffee. Preferably, the position of the arms 21 is staggered relative to the parts 22 of the dosing element 12 bounding the portion spaces. In the present exemplary embodiment, these parts 22 of the dosing element 12 are formed by radially extending arms 22, which are connected with a central hub 23. Because the arms 21 of the loosening element 18 are staggered relative to the arms 22 of the dosing element 12, the risk that the dosing element 12 with the loosening element 18 will experience much resistance when passing an edge 27 of the upper wall 10 bounding the inflow opening 11 is minimal. In fact, the respective arms 21, 22 do not pass the respective edge 27 simultaneously, so that the occurring forces are low and the coffee can escape to above or to below. At the lower side, the double ratchet mechanism 14, 15, 16 is covered with a cover plate 28. Attached to the ends of the shaft 17 are securing elements, such as, for instance, clamping springs 29, 30, which hold in place the different parts attached to the shaft.

Furthermore, a wiper 24 is connected with the dosing element 12, such that it co-rotates with the dosing element 12. The wiper 24 is arranged to wipe clean the transparent side wall of the holder 5. Provided on the shaft 17, near the upper end, is a cone-shaped closing part 31, which faces in the direction of the loosening element 18 with the broad side 32, while the narrow side is directed upward. The broad side 32 has a form and surface matching the hub 20, so that, during use, coffee is forced between the arms 21 and does not remain lying on the hub 20. Moreover, the wiper 24 is pressed by the closing pan 31 on the loosening element 18 and kept in position. Optionally, in the broad side 32 of the cone 31 and/or in the hub 20 a slot-shaped recess (not shown) may be provided to even better enclose the wiper 24. It is further noted that in the present exemplary embodiment the operating handle 13 is provided with two stop surfaces 25, which bound the extreme positions of the operating handle 13, because they strike against two stop surfaces 26 formed by side walls bounding the discharge opening 9.

The coupling 14, 15, 16 ensures that when the operating handle 13 is operated, the ratchet wheel 14 is rotated. When the operating handle 13 with the stop 25 thereof is moved against the stop surface 26, the second ratchet spring 16 will click behind the next tooth of the ratchet wheel. Only then can the operating handle 13 be moved back so far that the first ratchet spring 15 again can click behind a next tooth of the ratchet wheel 14, so that a next limited step can be made. When a previous user has not finished the stroke completely, a next user will be forced to first round off this stroke completely. Only then can the operating handle be moved back completely, until the first ratchet spring 15 clicks behind the next tooth and the next limited step can be traversed with the dosing element 12.

It may be clear that the dosing apparatus may be provided with a mounting bracket by means of which the apparatus can simply be attached to the wall. The apparatus is not only suitable for filling a filter holder, but also for filling a cafetiere or such an apparatus.

Figure 4:
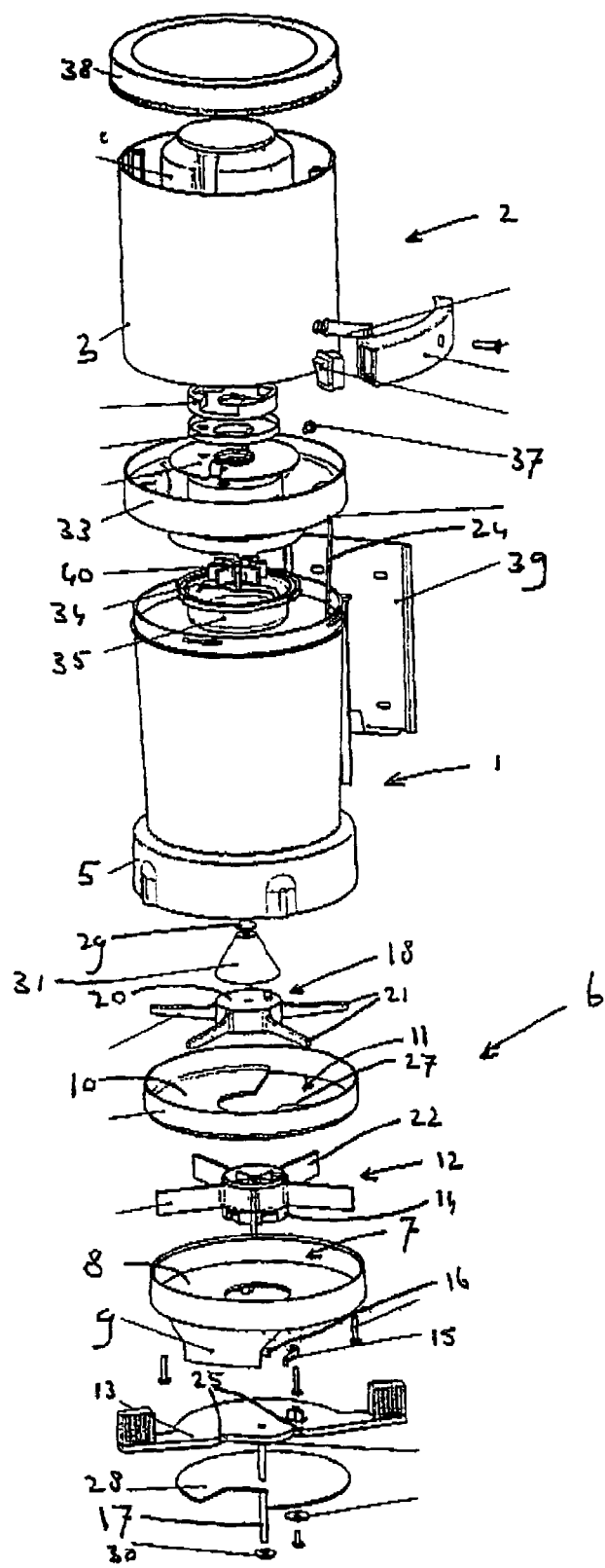
FIG. 4 shows a perspective view of a second exemplary embodiment of a dosing apparatus with coffee grinder.
Figure 5:
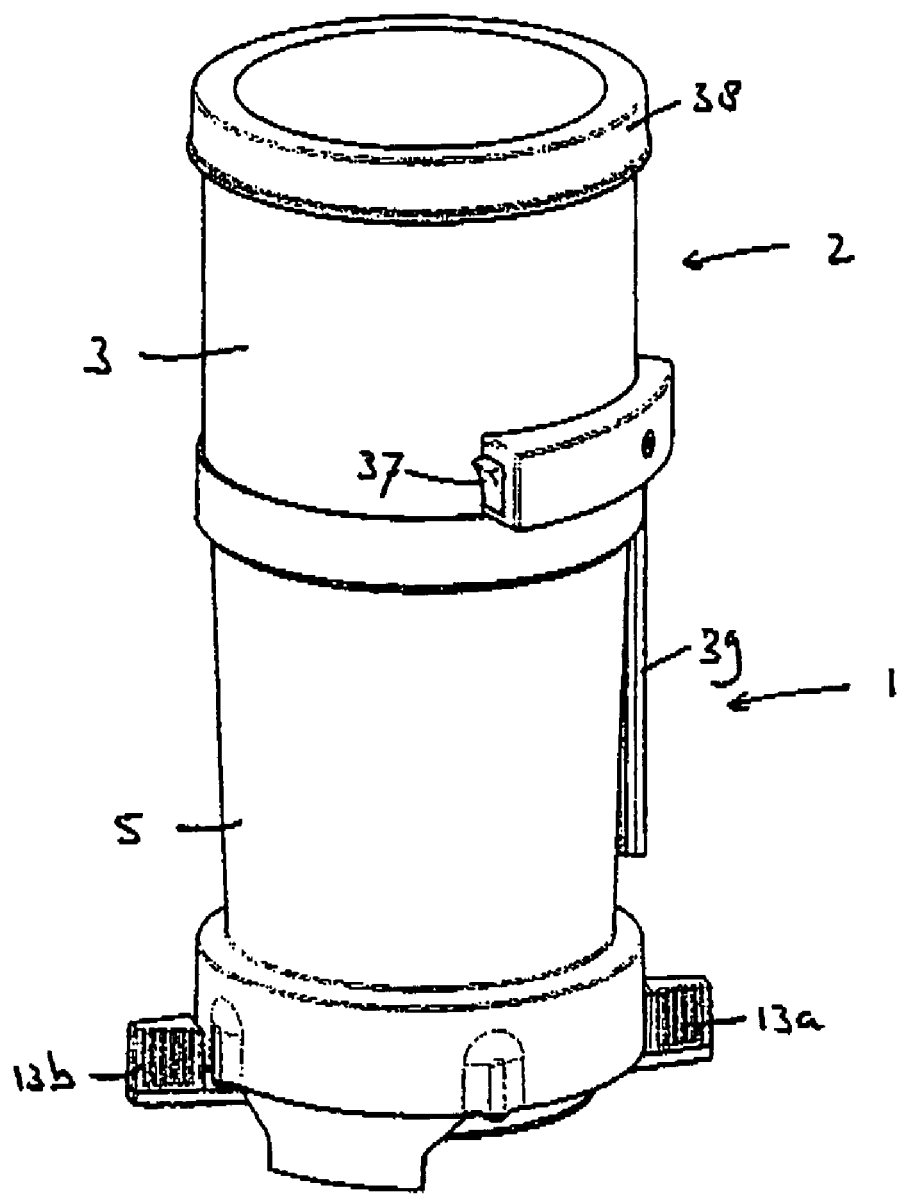
FIG. 5 shows a perspective view of the second exemplary embodiment in mounted condition.
Figure 6:
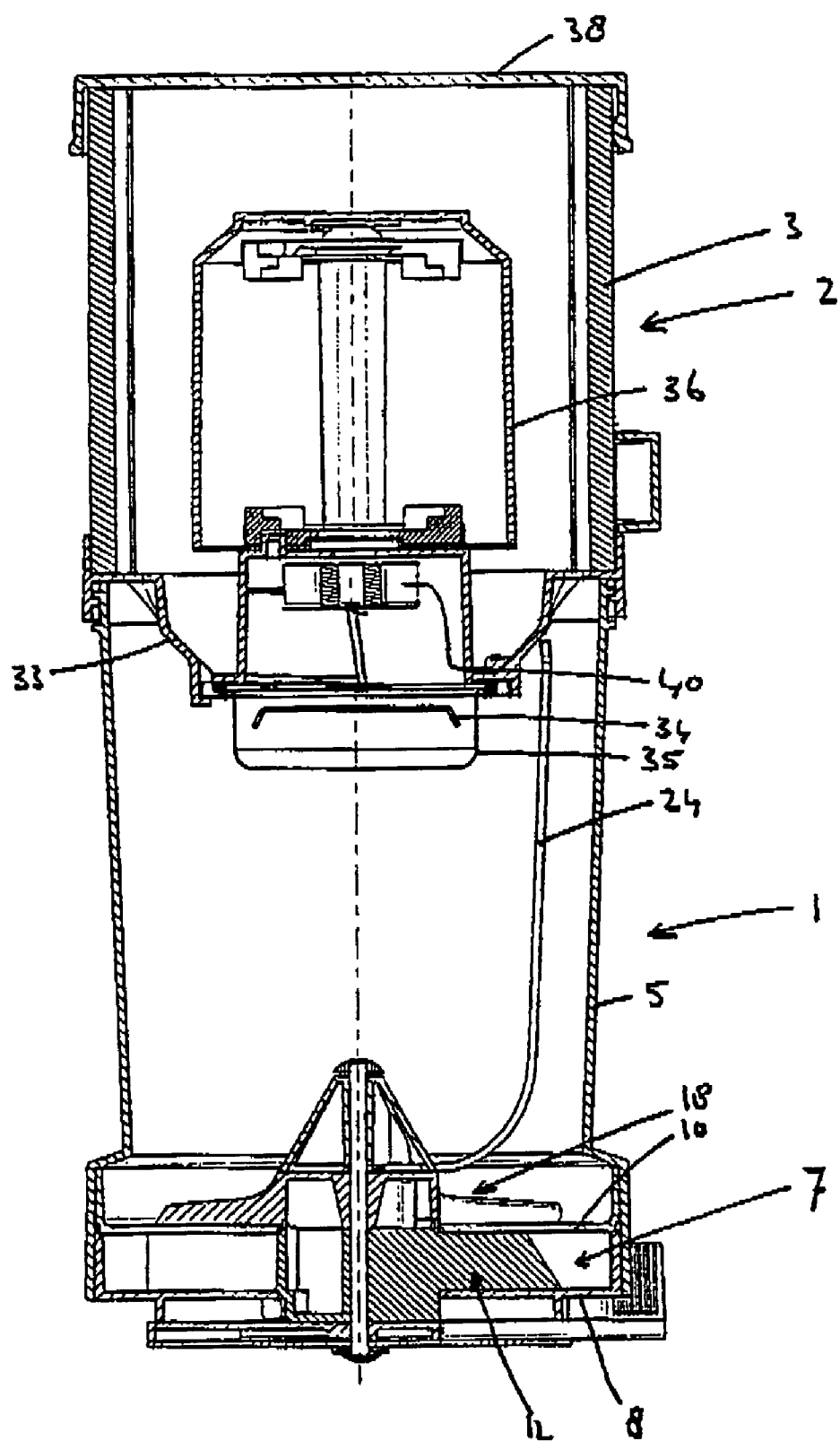
FIG. 6 shows a longitudinal section view of the exemplary embodiment represented in FIGS. 4 and 5.

The second exemplary embodiment of the coffee grinder/dosing apparatus combination represented in FIGS. 4–6 highly agrees to the first exemplary embodiment represented in FIGS. 1–3. Similar parts are indicated by the same reference numerals as those used for the first exemplary embodiment of FIGS. 1–3. The coffee grinder 2 is provided with a holder 3, which is provided at the upper side with a detachable cover 38, and which is provided near the upper side with a grinding beaker 33. Located near the lower side of the grinding beaker 33 is a ventilator 40 and a chopper 34 actually grinding the coffee. This chopper 34 is arranged in a sieve 35, which only passes ground coffee to the holder 5 of the coffee dosing apparatus. The ventilator 40 provides a desired discharge of ground coffee from the sieve 35. Located in the holder of the coffee grinder 2 is a motor housing 36, which accommodates the motor. It is clear that the motor drives the chopper 34 and the ventilator 40. The motor is switched on and off by means of a switch 37, which is clearly visible in FIGS. 4 and 5. Furthermore, these figures show a wall bracket 39, by means of which the assembly can be attached to the wall.

It may further be clear that the invention is not limited to the described exemplary embodiment, but that diverse modifications are possible within the scope of the invention as defined by the claims.

The invention claimed is:

1. A coffee dosing apparatus comprising: a holder for coffee powder and a dosing mechanism, the dosing mechanism being provided with a dosing chamber bounded at a lower side by a bottom wall with a discharge opening and bounded at an upper side by an upper wall with a feed opening, the feed opening being rotationally staggered relative to the discharge opening, such that the upper wall extends above the discharge opening, a dosing element bounding portion spaces and being rotatable about a substantially vertically extending axis arranged in the dosing chamber, a driving element connected with the dosing element, wherein the driving element comprises a manually operable handle, a coupling provided between the handle and the dosing element such that the dosing element is rotatable in subsequent discrete steps, wherein at the end of a first discrete step a first of the portion spaces is located above the discharge opening, and a subsequent discrete step is startable only after the first discrete step has been rounded off completely, the coupling comprising a double ratchet mechanism.

2. A coffee dosing apparatus according to claim 1, wherein the double ratchet mechanism is provided with a ratchet wheel, a first ratchet spring and a second ratchet spring, the ratchet wheel is connected with the dosing element so as to be restrained from rotation, the first ratchet spring is connected with the handle, the second ratchet spring is firmly connected with the lower side of the bottom wall, the ratchet wheel is located at the lower side of the bottom wall.

3. A coffee dosing apparatus according to claim 1, wherein a loosening element is located above the upper wall of the dosing chamber and is connected with the dosing element so as to be restrained from rotation.

4. A coffee dosing apparatus according to claim 1, wherein the loosening element comprises a central hub with a number of arms radially extending from the hub.

5. A coffee apparatus according to claim 4, wherein the position of the arms is staggered relative to arms of the dosing element bounding the portion spaces.

6. A coffee dosing apparatus according to claim 1, wherein a wiper is connected with the dosing element so as to be restrained from rotation, wherein the wiper is arranged to wipe clean a transparent side wall of the holder.

7. A coffee dosing apparatus according to claim 1, wherein a coffee grinder is mountable on an upper side of the holder.

8. A coffee dosing apparatus according to claim 7, wherein an upper wall of the holder is provided with thread for mounting a closing cover and a connecting ring is provided with thread for fastening the coffee grinder on the holder.

* * * * *